Feb. 26, 1946.                H. E. CARNAGUA                 2,395,459
                           AUTOMATIC TRANSMISSION
                             Filed July 8, 1943
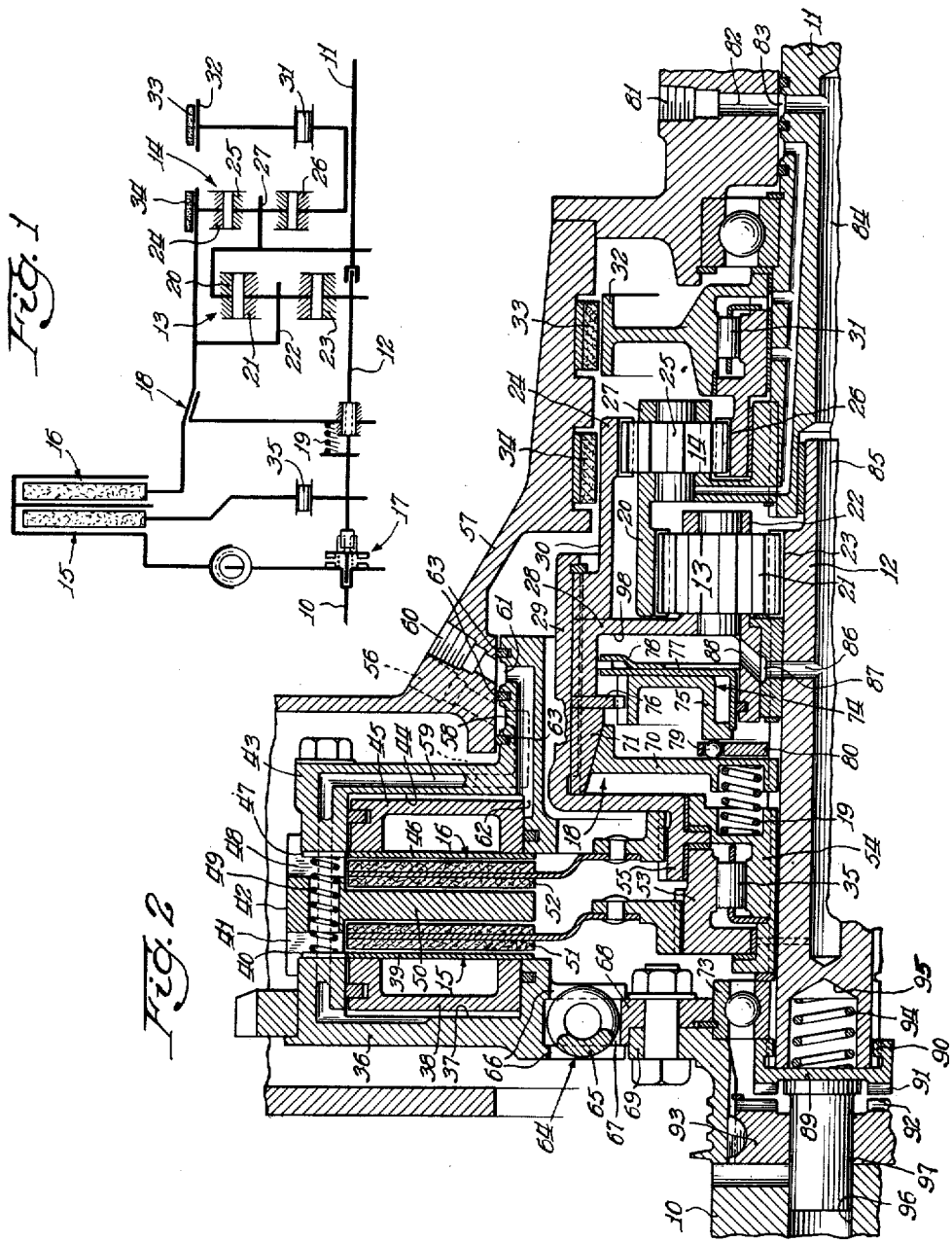
Inventor:
Harold E. Carnagua
By: Edward C. Fritzbaugh
Atty.

Patented Feb. 26, 1946

2,395,459

UNITED STATES PATENT OFFICE 2,395,459

AUTOMATIC TRANSMISSION

Harold E. Carnagua, Muncie, Ind., assignor to Borg-Warner Corporation, Chicago, Ill., a corporation of Illinois Application July 8, 1943, Serial No. 493,881

13 Claims. (Cl. 74—268)

This invention relates to variable speed transmissions, and particularly to such transmissions employing complex planetary gearing.

The principal object of this invention is to provide a planetary transmission capable of producing at least three speeds forward, each of which speeds is made effective by the successive operation of a plurality of coupling elements, each element being associated with a particular speed ratio.

Another object of this invention is to provide a planetary transmission capable of producing a plurality of speed ratios corresponding to first, second and direct speeds in an ordinary standard three-speed transmission wherein a plurality of coupling elements is utilized, certain of said elements being automatically releasable when other elements are engaged so as to avoid the necessity for accurately timing overlapping operation of controls.

Another object of this invention is to provide a planetary type varable speed transmission wherein changes in speed may be effected under power and wherein all of the normal and necessary functions provided in a standard transmission will be available.

These and other features and objects of this invention will become apparent from the following detailed description when taken together with the accompanying drawing in which:

Fig. 1 is a schematic diagram of the principal elements of the transmission and their connections; and Fig. 2 is a partial elevation in section of a preferred embodiment of the invention.

The invention is comprised of a drive shaft 10 which may be the crank shaft of a prime mover (not shown), a driven shaft 11 which may be connected to the load, an intermediate shaft 12 piloted in drive shaft 10 and in driven shaft 11, a first planetary gear 13 and a second planetary gear set 14, through which changes in speed and torque are effected, and a pair of engine clutches 15 and 16, which are adapted to connect various elements of planetary gear sets 13 and 14 to drive shaft 10. A one-way clutching device 17 is provided to connect shaft 12 with shaft 10 so that power may be transmitted from the driven shaft 11 to drive shaft 10 whenever necessary, such as to start the prime mover when its usual starting mechanism is not available. A friction cone clutch 18 is provided to lock up the first planetary gear set 13 to provide a direct drive, clutch 18 being normally biased to engaged position by a spring 19. Clutch 18 participates in the drive when driven shaft 11 becomes the driver and it is desired to drive drive shaft 10 with the prime mover dead.

First planetary gear set 13 is comprised of a ring gear 20, a plurality of planet pinions 21, mounted on a planet carrier 22 and meshing with ring gear 20 and with a sun gear 23, the latter being preferably integral with intermediate shaft 12. The second planetary gear set 14 is comprised of a ring gear 24, a plurality of planet pinions 25 meshing with ring gear 24 and with a sun gear 26, and mounted on a planet carrier 27. Sun gear 26 is mounted on driven shaft 11 and is adapted to rotate freely thereon. Carrier 27 in the form chosen for illustration is integral with ring gear 20 of the first planetary gear set with ring gear 20 rotatable therewith, and is splined to so as to be rotatable therewith, and is splined to driven shaft 11 to transmit or receive a drive from said driven shaft 11. Carrier 22 is integral with an annular casting 28 which is splined to a drum 29, ring gear 24 having an extension 30 likewise splined to drum 29 thereby causing planet carrier 22 and ring gear 24 to rotate together. An annular chamber 98 is formed in casting 28, the purpose of which will be explained hereinafter.

Sun gear 26 is connected through a one-way coupling device 31 to a brake drum 32 which may be held against rotation by a brake band 33. Ring gear 24 and its associated drum 29 and planet carrier 22 may likewise be held against rotation by the action of a brake band 34 on the outer surface of extension 30.

A one-way clutch 35 is provided in series with clutch 15 and intermediate shaft 12 to assist in effecting changes in speed ratio as will hereinafter be explained. The speed ratios obtainable through the transmission as thus far described are as follows:

Low speed is obtained by arresting sun gear 26 through the operation of brake band 33, the disengagement of clutch 18 and by engaging clutch 15. This causes a drive to be transmitted from drive shaft 10 through clutch 15, one-way clutch 35, intermediate shaft 12, sun gear 23, planet pinions 21, and through carrier 22, casting 28, drum 29, extension 30, ring gear 24, and finally to planet gears 25 and planet carrier 27 to driven shaft 11. A backward reaction will be produced by this combination of elements which will be taken on one-way coupling device 31 and brake 33.

For second speed, clutch 16 is engaged along with brake 33 and clutch 15. The drive is then from drive shaft 10 through clutch 16, drum 29, extension 30 to ring gear 24, and then as in first speed through planet pinions 25 and planet carrier 27 to driven shaft 11. One-way clutch 35 overruns in second speed so that the release of clutch 15 is unnecessary.

For direct drive, clutch 18 is allowed to engage which, as stated previously, locks up the first planetary gear set 13 by connecting drum 29 to intermediate shaft 12, which in effect connects carrier 22 to sun gear 23. The reaction on brake 33 in direct drive is in a forward direction and as a result, one-way coupling device 31 will release sun gear 26 and permit it to rotate forwardly with other gears.

For neutral with power available to disengage clutch 18, all clutches and brakes are released; with no power available clutch 18 will be engaged as well as one-way coupling 17, the purpose of this arrangement being to permit the drive to be reversed through the transmission. Thus, with no power available there is no neutral when shaft 11 becomes the driver, but there is a neutral when the shaft 10 does the driving.

For reverse, brake band 34 is applied, brake band 33 is released, clutch 16 is released, and clutch 15 is engaged. This means that carrier 22 will be held against rotation and that the drive will be impressed upon sun gear 23 through intermediate shaft 12, and one-way coupling device 35, from clutch 15 and drive shaft 10. Clutch 18 will of course be released during reverse drive. Since carrier 22 is held against rotation and the drive is in a forward direction in sun gear 23, ring gear 20 will be rotated reversely and at a reduced speed. Since ring gear 20 is rotatable with driven shaft 11, the reverse rotation in ring gear 20 will be transmitted directly to driven shaft 11.

In the embodiment illustrated herein, clutches 15, 16 and 18, and one-way device 17 are adapted to be controlled by fluid pressure. To this end clutch 15 is comprised of an annular casting 36 which is hollowed out to form an annular chamber 37. A piston 38 is mounted in chamber 37 and is adapted to bear against a plate 39 having ears 40 fitting into slots 41 in a reaction plate 42 driven with casting 36. Immediately adjacent reaction plate 42 is an annular casting 43 which is likewise hollowed to form an annular chamber 44. A piston 45 is retained in chamber 44 and acts against the plate 46 which is similar to plate 39, having ears 47 extending into slots 48 in reaction plate 42. A spring 49 bears against ears 47 and 40 and serves to maintain plates 39 and 46 away from reaction plate 42. This also insures a return of pistons 38 and 45 to their released positions.

Reaction plate 42 is considerably reduced in cross-section at its central portion 50 so as to form annular spaces on either side facing pistons 38 and 45 in which driven clutch plates 51 and 52 are located. Clutch plate 51 is splined to the outer member 53 of one-way clutch 35, the inner member 54 of which is splined to intermediate shaft 12. Driven clutch plate 52 is splined to a stepped portion 55 of drum 29.

Fluid to operate clutch 15 is introduced through a passageway 56 in transmission housing 57 and then to a collector ring 58 and a connecting passage 59. Said passage 59 leads directly to chamber 37. Similarly, fluid for operating clutch 16 is introduced into a passageway 60 in housing 57 to a collector ring 61 which is adjacent collector ring 58 and connects with a passageway 62 leading directly to chamber 44.

Suitable piston ring-type seals 63 separate collector rings 58 and 61 and also prevent the fluid from escaping into the housing.

In order to economize on space, the torsional vibration dampeners usually incorporated into driven clutch discs have been combined into a single vibration dampener 64 which is inserted in series between the friction clutches 15, 16 and the crank shaft 10. The dampener is comprised of a plurality of springs 65 retained between spaced lugs 66 in casting 36 and a tongue 67 on a hub member 68 which is bolted to crank shaft flange 69.

It will be noted that drum 29 is nested within collector rings 58 and 61 still further to economize on space in a longitudinal direction.

The direct drive clutch 18 is comprised of a clutch plate 70 splined to intermediate shaft 12 and urged by a spring 19 into engagement with a conical ring 71 splined to drum 29. Said spring 19 bears against the inner member 54 of one-way coupling device 35 which in turn bears against an axially fixed bearing 73. The outer surface of clutch plate 70 has a cone surface which is complementary with respect to the conical surface on ring 71 so as to provide a friction drive therebetween. Although clutch 18 is relatively small in diameter compared with clutches 15 and 16, its capacity is quite large because of the wedging effect of the conical surfaces and is capable of transmitting full engine torque. Clutch plate 70 is moved to released position by means of a piston 74 which is comprised of a casting 75 splined to a plate 76 which in turn is splined to drum 29 so that piston 75 is constrained to rotate with drum 29, and a pair of stampings 77 and 78 which are exposed to fluid ing a chamber 98 formed in casting 28. The thrust is transmitted to plate 70 by means of a plurality of anti-friction balls 79 retained in a washer 80.

Fluid for operating clutch 18 is introduced through an opening 81 in housing 57 communicating with a passageway 82 leading to a collector ring 83 in driven shaft 11 and then through a central passageway 84 in shaft 11 and a corresponding central passageway 85 in intermediate shaft 12 to a radial passageway 86 leading to a collector ring 87 splined to intermediate shaft 12 and communicating with a passageway 88 leading directly into chamber 98.

One-way coupling device 17 is comprised of a plate 89 having a splined connection 90 with intermediate shaft 12 and having ratchet teeth 91 on the forward side thereof. Said ratchet teeth 91 cooperate with similar ratchet teeth 92 formed in a ring 93 keyed to drive shaft 10 so as to be rotatable therewith. A spring 94 located in an opening 95 in the end of intermediate shaft 12 normally urges plate 89 toward drive shaft 10 so as to engage teeth 91 with teeth 92. Drive shaft 10 is provided with an opening 96 in which is a slug 97 which acts as a piston and bears against plate 89 to move the plate out of engagement with teeth 92 and against the end of shaft 12. Opening 96 is connected by suitable passageway (not shown) to the oil pump of the prime mover (not shown) so that whenever the prime mover is in operation oil under pressure will be present in opening 96 and will disengage teeth 91 from teeth 92. However, should the prime mover be at rest so that no oil under pressure is available, then spring 94 will urge plate 89 and its associated teeth 91 into engagement with teeth 92 thereby making possible a drive from intermediate shaft 12 to drive shaft 10. Teeth 91 and 92 are arranged to transmit a drive from shaft 12 to shaft 10, but to ratchet when the drive is reversed. It will be noted that no fluid under pressure is required to engage clutch 18 and therefore a direct drive will be established through the first planetary gear set 13 whereby to drive drive shaft 10 from driven shaft 11 at one-to-one ratio. This drive may be utilized to start the prime mover if the usual starting means is unavailable. It is contemplated that the same fluid under pressure available in opening 96 will likewise be available to operate piston 74 of the clutch 18 to disengage said clutch when one-way clutching device 17 is disengaged.

It is understood that various additional bearings, fasteners and supports should be used throughout the transmission as needed, such devices being readily designed by those skilled in the art.

I claim:

1. A variable speed transmission comprising driving and driven elements, and first and second planetary gear sets for transmitting the drive from the driving element to the driven element, each set comprising ring, planet and sun gears, the ring gear of the first set and planet gears of the second set being connected to the driven element, and the planet gears of the first set and the ring gear of the second set being connected together, means for holding the sun gear of the second set against rotation, means for connecting the carrier to the driving element and means for connecting the sun gear of the first set to the driving element, said last mentioned means including an overrunning clutch.

2. A variable speed transmission as described in claim 1, and one-way connecting means between the sun gear of the second set and the holding means therefor for interrupting the drive between the driving and driven elements upon reversing the torque between said elements.

3. A variable speed ratio transmission having driving and driven elements and adapted to establish first, second and third speed ratios between said elements, said transmission comprising first and second planetary gear sets, each set comprising ring, planet and sun gears, the ring gear of the first set and the planet gears of the second set being connected to the driven element and the planet gears of the first set and ring gear of the second set being connected together, releasable means for holding the sun gear of the second set against rotation to establish a reaction for torque multiplication in the transmission, releasable means for connecting the sun gear of the first set to the driving element to establish the first speed ratio through the transmission, means for connecting the ring gear of the second set to the driving element while the first sun gear is released therefrom to establish the second speed ratio, and means for driving two elements of one of the sets simultaneously at the same speed as the driving element while the sun gear of the second set is released from its holding means to establish the third speed ratio through the transmission.

4. A variable speed transmission comprising driving and driven elements, and first and second planetary gear sets for transmitting the drive from the driving element to the driven element, each set comprising ring, planet and sun gears, the ring gear of the first set and planet gears of the second set being connected to the driven element, and the planet gears of the first set and the ring gear of the second set being connected together, means for holding the sun gear of the second gear set against rotation to provide a reaction for torque multiplication, said holding means being automatically releasable when the driven shaft becomes the driver, normally released means for selectively connecting the carrier and sun gear of the first set to the driving element, means adapted to connect two elements of one of the planetary gear sets together when the holding means is released, whereby to transmit drive from the driven element to a gear in the first planetary gear set when the holding means is released, and means for connecting the said gear in the first planetary gear set to the driving element to transmit a drive from the driven element to the driving element.

5. A planetary transmission for transmitting torque from a driving element to a driven element, said transmission including a plurality of gears, a reaction element associated with one of the gears which is automatically released when the driven element becomes the driver, normally released clutch means for connecting different gears to the driving element to establish different speed ratios through the transmission normally engaged clutch means for connecting two relatively rotatable gears together to lock the transmission in one-to-one ratio, and means effective when the normally engaged clutch is effective for connecting one of the gears of the planetary to the driving element whereby to transmit drive from the driven element to the driving element independently of the reaction element and the normally released clutch means.

6. A planetary transmission as described in claim 5, the means for connecting one of the gears to the driving element being ineffective when the driving element becomes the driver.

7. A planetary transmission as described in claim 5, the means for connecting one of the gears to the driving element being ineffective when the driving element becomes the driver and means for rendering the said connection means inoperative.

8. A planetary transmission as described in claim 5, and fluid means for disengaging the normally engaged clutch means and the last-named connecting means, said fluid means being operative when the driving element becomes the driver.

9. A variable speed transmission comprising driving and driven structures, planetary gearing for transmitting the drive from the driving structure to the driven structure, and means for connecting the planetary gearing to the driving structure including a pair of friction clutches, a rotatable housing for the clutches, fluid operated means for controlling the operation of said clutches, an axially extending flange on the housing provided with conduits for the fluid to control the operation of said clutches, a drum for connecting one of said clutches to the planetary gear set, said drum being located within the flange, and a third friction clutch within the drum, said third friction clutch being adapted to lock the planetary gear set for direct drive operation.

10. A variable speed transmission as described in claim 9, said planetary gearing comprising a pair of planetary gear sets including a ring gear in one set and a planet carrier in the other set and means for connecting said ring gear and carrier to the drum.

11. A variable speed transmission as described in claim 9, said last mentioned clutch including a friction ring and means for non-rotatably connecting the ring to the drum.

12. A variable speed transmission as described in claim 9, said planetary gearing including a carrier, means for connecting the carrier to the drum, said carrier having an annular recess therein, and a piston in said recess, said piston controlling the operation of the third clutch.

13. A variable speed transmission comprising driving and driven structures, planetary gearing for transmitting the drive from the driving structure to the driven structure, and means for connecting the planetary gearing to the driving structure, said means including a clutch, a drum for connecting the clutch to the planetary gear set, a friction clutch within the drum and adapted to lock the planetary gear set for direct drive operation, a carrier in the gear set, means for connecting the carrier to the drum, said carrier having a recess therein and being enclosed by the drum, and a piston in said recess, said piston controlling the operation of the last-mentioned clutch.

HAROLD E. CARNAGUA.

Certificate of Correction

Patent No. 2,395,459. February 26, 1946.

HAROLD E. CARNAGUA

It is hereby certified that errors appear in the printed specification of the above numbered patent requiring correction as follows: Page 1, first column, line 22, for "varable" read *variable*; line 41, after "gear" insert *set*; page 2, second column, line 38, for the syllable "ing" read *in*; and that the said Letters Patent should be read with these corrections therein that the same may conform to the record of the case in the Patent Office.

Signed and sealed this 21st day of May, A. D. 1946.

[SEAL]

LESLIE FRAZER,
*First Assistant Commissioner of Patents.*

11. A variable speed transmission as described in claim 9, said last mentioned clutch including a friction ring and means for non-rotatably connecting the ring to the drum.

12. A variable speed transmission as described in claim 9, said planetary gearing including a carrier, means for connecting the carrier to the drum, said carrier having an annular recess therein, and a piston in said recess, said piston controlling the operation of the third clutch.

13. A variable speed transmission comprising driving and driven structures, planetary gearing for transmitting the drive from the driving structure to the driven structure, and means for connecting the planetary gearing to the driving structure, said means including a clutch, a drum for connecting the clutch to the planetary gear set, a friction clutch within the drum and adapted to lock the planetary gear set for direct drive operation, a carrier in the gear set, means for connecting the carrier to the drum, said carrier having a recess therein and being enclosed by the drum, and a piston in said recess, said piston controlling the operation of the last-mentioned clutch.

HAROLD E. CARNAGUA.

Certificate of Correction

Patent No. 2,395,459.　　　　　　　　　　　　　　　　　February 26, 1946.

HAROLD E. CARNAGUA

It is hereby certified that errors appear in the printed specification of the above numbered patent requiring correction as follows: Page 1, first column, line 22, for "varable" read *variable*; line 41, after "gear" insert *set*; page 2, second column, line 38, for the syllable "ing" read *in*; and that the said Letters Patent should be read with these corrections therein that the same may conform to the record of the case in the Patent Office.

Signed and sealed this 21st day of May, A. D. 1946.

[SEAL]

LESLIE FRAZER,
*First Assistant Commissioner of Patents.*